US011411599B2

United States Patent
Subraveti et al.

(10) Patent No.: US 11,411,599 B2
(45) Date of Patent: Aug. 9, 2022

(54) MANAGING A COMMUNICATION SYSTEM WITH A PLURALITY OF ANCHOR DEVICES USING ULTRA-WIDE BAND COMMUNICATION

(71) Applicant: NXP B.V., Eindhoven (NL)

(72) Inventors: Diwakar Subraveti, Bangalore (IN); Atmaram Kota Rajaram, Bengaluru (IN); Nidhin Vadakkan, Mahe (IN); Hendrik Ahlendorf, Munich (DE); Brima Babatunde Ibrahim, Laguna Hills, CA (US)

(73) Assignee: NXP B.V., Eindhoven (NL)

( * ) Notice: Subject to any disclaimer, the term of this patent is extended or adjusted under 35 U.S.C. 154(b) by 3 days.

(21) Appl. No.: 17/085,311

(22) Filed: Oct. 30, 2020

(65) Prior Publication Data

US 2021/0159938 A1    May 27, 2021

(30) Foreign Application Priority Data

Nov. 21, 2019 (EP) ..................................... 19210574

(51) Int. Cl.
*H04B 1/7073* (2011.01)

(52) U.S. Cl.
CPC .................................. *H04B 1/7073* (2013.01)

(58) Field of Classification Search
CPC ............ H04B 1/7073; H04W 56/0065; H04W 56/0015; H04W 56/00; H04W 56/001; H04W 64/00; H04J 3/0661
See application file for complete search history.

(56) References Cited

U.S. PATENT DOCUMENTS

2003/0169697 A1\* 9/2003 Suzuki .................... H04L 47/14
455/524
2009/0249478 A1\* 10/2009 Rosener .............. H04L 63/0853
726/19
(Continued)

FOREIGN PATENT DOCUMENTS

EP          3425867 A1    1/2019
EP          2117546 B1    4/2019
(Continued)

OTHER PUBLICATIONS

IEEE Standard for Information Technology 802.15.4a Part 15.4: Wireless Medium Access Control (MAC) and Physical Layer (PHY) Specifications for Low-Rate Wireless Personal Area Networks (WPANs); Aug. 31, 2007.

(Continued)

*Primary Examiner* — Sam K Ahn
*Assistant Examiner* — Amneet Singh (57) ABSTRACT

A method is described synchronization in a communication system which comprises a master anchor device, a first anchor device, and a second anchor device. The method comprises: i) transmitting, by the master anchor device, a first message to the first anchor device and to the second anchor device using a first ultra-wide band (UWB) communication, wherein the first message is indicative of a master clock of the master anchor device receiving, by the first anchor device, the first message, and synchronizing a first clock of the first anchor device based on the master clock, and iii) receiving, by the second anchor device, the first message, and synchronizing a second clock of the second anchor device based on the master clock. Furthermore, a communication system and a use of UWB communication is described.

15 Claims, 3 Drawing Sheets

(56) References Cited

U.S. PATENT DOCUMENTS

2015/0185309 A1 7/2015 Pu et al.
2016/0343032 A1* 11/2016 DeWitt .............. G06Q 30/0267
2017/0131383 A1 5/2017 Bartov et al.
2018/0302869 A1 10/2018 Hollar
2020/0045661 A1* 2/2020 Verso ................ H04W 56/0015

FOREIGN PATENT DOCUMENTS

KR 101092209 B1 12/2011
WO 2016189526 A1 12/2016
WO WO 2018/162753 A1 * 9/2018 ........ H04W 56/0015

OTHER PUBLICATIONS

IEEE 802.15 WPAN Task Group 4z; Enhanced Impulse Radio; Oct. 27, 2020.

Cho, Seong Han et al.; "A Design of Synchronization Method for TDOA-Based Positioning System;" 2012 12th International Conference on Control, Automation and Systems; Oct. 17-21, 2012, JeJu Island, South Korea.

Krukar, Grzegorz et al.; "Proof-of-Concept Real Time Localization System Based on the UWB and the WSN Technologies;" 2014 International Conference on Indoor Positioning and Indoor Navigation (IPIN); Oct. 27-30, 2014, Busan, South Korea; DOI: 10.1109/IPIN.2014.7275559.

Kullayappa, Kanekal Chinna et al.; "Localization Techniques in Sensor Networks—an Insight;" 2017 IEEE International Conference on Computational Intelligence and Computing Research (ICCIC), Dec. 14-16, 2017, Coimbatore, India; DOI: 10.1109/ICCIC.2017.8524542.

Mazraani, Rami et al.; "Experimental Results of a Combined TDOA/TOF Technique for UWB Based Localization Systems;" 2017 IEEE International Conference on Communications Workshops (ICC Workshops); May 21-25, 2017; Paris, France; DOI: 10.1109/ICCW.2017.7962796.

Sewio, UWB Technology; "Time Difference of Arrival;" Retrieved from the Internet Oct. 27, 2020.

Verso, Billy; "Ranging Procedures and Messages;" IEEE Draft for IEEE P802.15 Working Group for Wireless Personal Area Networks (WPANs); Submitted: Sep. 10, 2018; IEEE P802.15-18-xxxx-00-004z, Nov. 2018; https://mentor.ieee.org/802.15/dcn/18/15-18-0599-00-004z-draft-text-covering-two-way-ranging-mechanisms-procedures-and-messages.docx on Nov. 15, 2018.

* cited by examiner

MANAGING A COMMUNICATION SYSTEM WITH A PLURALITY OF ANCHOR DEVICES USING ULTRA-WIDE BAND COMMUNICATION

CROSS-REFERENCE TO RELATED APPLICATIONS

This application claims priority under 35 U.S.C. § 119 to European Patent Application No. 19210574.0, filed on Nov. 21, 2019, the contents of which are incorporated by reference herein.

FIELD OF THE INVENTION

The invention relates to a method of synchronization in an anchor communication system. The invention further relates to a method for localization of a mobile device in a communication system, which system comprises the anchor communication system. Further, the invention relates to the anchor communication system and the communication system. The invention also relates to a use of an ultra-wide band communication in order to synchronize a plurality of anchor devices.

BACKGROUND OF THE INVENTION

Radio frequency (RF) ranging systems can be used in localization systems in order to determine a spatial position of a mobile device (e.g. a tag). Said spatial position can be calculated by measuring the distance from the mobile device to multiple anchor devices using either a single-sided or a double-sided ranging procedure. Both ranging methods require the mobile device or the anchor devices to send a "poll" message, which is then answered with a response. In double-sided ranging, a "final" message is transmitted to obtain better correction of the crystal timing offsets. The Time of Flight (ToF) of a message between the mobile device and the anchor devices can be determined and can then be translated into an accurate distance. Said distance is then used for the localization of the mobile device (when the positions of the anchor devices are known). The described method has, however, several drawbacks. The channel usage is increasing linearly with the number of anchor devices and mobile devices performing localization in such a network. The method is not applicable in dense environments (e.g. airport, stadium) as the IR-UWB channel capacity is limited (only a few 500 MHz channels available, only channel 9 available worldwide).

Especially in cellular networks (e.g. LTE), a common method for localization is called Time Difference of Arrival (TDoA). Hereby, a mobile device (e.g. phone) is sending a signal to multiple base-stations at the same time. The base-stations receive the signal and can calculate the time difference of the signal arrival at the base-stations. The advantage of TDoA is the fact that it is unidirectional. A mobile device, which is receiving signals from multiple synchronized anchor devices, can determine its own position without sending a message (packet) to an anchor device. The other way around, multiple anchor devices can receive signals from the mobile device and are enabled to determine the position of the mobile device without that the mobile device needs to receive a message from the anchor devices.

However, a main problem of TDoA is the anchor device synchronization itself, which may require an exact calibration of the clocks (in particular in the pico-second region) of the anchor devices and continuous calibration updates. Furthermore, the use of a mobile device (in particular a plurality of mobile devices) in a communication (localisation) system, wherein the mobile device(s) send(s) a message to the anchor devices, may lead into channel capacity issues, because the channel usage increases linearly with the number of mobile devices.

OBJECT AND SUMMARY OF THE INVENTION

It is an object of the invention to provide a method of managing a communication system with a plurality of anchor devices in an efficient and robust manner.

In order to achieve the object defined above, methods, systems, and a use according to the independent claims are provided.

According to an aspect of the invention, a method of synchronization in an anchor communication system is described, wherein the anchor synchronization system comprises a master anchor device, a first anchor device, and a second anchor device. The method comprises: i) transmitting (by the master anchor device) a first message (e.g. a signal, a packet, a frame) to the first anchor device and to the second anchor device using a first ultra-wide band (UWB, IR-UWB) communication, wherein the first message is indicative of a master clock of the master anchor device (e.g. comprises a master time stamp), ii) receiving (by the first anchor device) the first message, and synchronizing a first clock of the first anchor device based on the master clock (e.g. by calculating a first offset between the master time stamp and a first time stamp provided, when receiving the first message at the first anchor device (in particular under consideration of the time of flight between the master anchor device and the first anchor device)), and iii) receiving (by the second anchor device) the first message, and synchronizing a second clock of the second anchor device based on the master clock (e.g. by calculating a second offset between the master time stamp and a second time stamp provided, when receiving the first message at the second anchor device (in particular under consideration of the time of flight between the master anchor device and the second anchor device)).

According to a further aspect of the invention, a method for localization of a mobile device in a communication system is described, wherein the communication system comprises the mobile device and the anchor communication system as described above. The method comprises: i) synchronizing the anchor devices as described above, iia) transmitting a second message (by the mobile device) using a second ultra-wide band communication, and receiving the second message (by at least two of the group consisting of the master anchor device, the first anchor device, the second anchor device) at respective arrival times, and/or iib) transmitting respective second messages (by at least two of the group consisting of the master anchor device, the first anchor device, the second anchor device) using a second ultra-wide band communication, and receiving the second messages (by the mobile device) at respective arrival times, and iii) performing (e.g. by the mobile device, by the master anchor device, by the slave anchor devices, by an external control unit, etc.) a time difference of arrival (TDoA) calculation based on the respective arrival times of the second message and at least two of the group consisting of the master clock, the synchronized first clock, the synchronized second clock (e.g. by providing a time stamp at the arrival time of the second message at the first anchor device and taking into consideration the offset of the first clock to the master clock).

According to a further aspect of the invention, an anchor communication system is described, wherein the anchor communication system comprises: i) a master anchor device comprising a master clock, ii) a first anchor device comprising a first clock, and iii) a second anchor device comprising a second clock. The master anchor device is configured to: a) transmit a first message to the first anchor device and to the second anchor device using a first ultra-wide band communication, wherein the first message is indicative of the master clock. The first anchor device is configured to: b) receive the first message and synchronize the first clock based on the master clock. The second anchor device is configured to: c) receive the first message and synchronize the second clock based on the master clock.

According to a further aspect of the invention, a communication system is described wherein the communication system comprises: i) the anchor communication system as described above, and ii) a mobile device. a) The mobile device is configured to: transmit a second messages using a second ultra-wide band communication, and at least two of the group consisting of the master anchor device, the first anchor device, the second anchor device, are configured to: receive the second message at respective arrival times, and/or b) at least two of the group consisting of the master anchor device, the first anchor device, the second anchor device, are configured to: transmit respective second messages using a second ultra-wide band communication, and the mobile device is configured to: receive the second messages at respective arrival times, and c) the communication system is configured to: perform a time difference of arrival (TDoA) calculation based on the respective arrival times and at least two of the group consisting of the master clock, the synchronized first clock, the synchronized second clock.

According to a further aspect of the invention, a use of an ultra-wide band communication is described in order to synchronize a first clock of a first anchor device and a second clock of a second anchor device based on a master clock of a master anchor device.

In the context of the present application, the term "mobile device" may refer to any electric device that is portable and may establish an UWB connection to anchor devices. A mobile device may for example be a mobile phone, a tag, a token, or a key. A mobile device may be associated with a target device (e.g. a car, a door, a transit gate, etc.).

In the context of the present application, the term "target device" may refer to any device that can be associated with a mobile device and/or anchor devices. In an embodiment, an authorization may be needed to access the target device. In another embodiment, the target device may be a car and a target device payload may comprise authentication information to open the car. In another embodiment, the target device may be a door (e.g. of an office or a hotel) and a target device payload may comprise authentication to open the door. In a further embodiment, the target device may be in a transit area, and the payload may comprise buying a ticket.

In the context of the present application, the term "anchor device" may refer to any electric device that may communicate with a mobile device via UWB. An anchor device may be associated (e.g. arranged at or coupled to) with a target device. An anchor device may also be termed e.g. a beacon, a node, or a marker. An anchor device may be an unidirectional or a bidirectional communication device. In an exemplary example, an anchor device comprises an UWB transceiver, a secure element, and a network connection. An anchor device may be configured as a master anchor device or as a slave anchor device. Hence, an anchor device may be configured to communicate with other anchor devices, e.g. vie UWB communication.

In the context of the present application, the term "message" may refer to one or more signals and/or data that is transferred between electric devices such as a mobile device and anchor device(s) or between anchor devices. A message may be a packet or a frame. According to an example, a first message (e.g. from a master anchor device) may be transmitted for synchronization and a second message (e.g. from a mobile device) may be transmitted to perform a TDoA procedure. In an example, the first message may be transmitted before the second message.

In the context of the present application, the term "ultra-wide band communication" (or ultra-wideband) may refer to a radio technology that can use a very low energy level for short-range, high-bandwidth communications over a large portion of the radio spectrum. UWB may refer to a technology for transmitting information spread over a large bandwidth (>500 MHz). UWB may be defined as an antenna transmission for which emitted signal bandwidth exceeds the lesser of 500 MHz or 20% of the arithmetic center frequency. UWB transmissions may transmit information by generating radio energy at specific time intervals and occupying a large bandwidth, thus enabling pulse-position or time modulation. The range of UWB may be for example in the range of $10^{th}$ of meters. An UWB (RF) ranging system may employ the Time-of-Flight principle to determine the distance between a mobile device and a target device (e.g. a car to be opened) and/or anchor devices (markers) on the target device. Usually, a transceiver's transmitter sends out a waveform, commonly a chirp or a pulse, which is either reflected by an object or retransmitted by a second transceiver. Based on the amount of time it takes for the reflection or retransmission to reach the originating transceiver's receiver, the distance between the objects can be calculated. The so determined range between the receiver and the transmitter is then used as a control point (to enable access). In the same manner, payload may be transferred using UWB. In the present context, "UWB communication" includes impulse-radio-ultra-wide band (IR-UWB) (see for example the standards IEEE802.15.4a and IEEE802.15.4z).

According to an exemplary embodiment, the invention may be based on the idea that a method of managing a communication system with a plurality of anchor devices in an efficient and robust manner can be provided, when a synchronization of (slave) anchor devices is performed by transmitting UWB communication based first message that is indicative for the master clock from a master anchor device to said slave anchor devices. In other words, synchronization of the anchor devices is done wirelessly using in-band UWB signalling. In the described manner, an anchor device synchronization with pico-second resolution may be enabled. This surprisingly efficient and robust synchronization enables an advantageous TDoA-based localization. Furthermore, the management of multiple mobile devices in a communication (localization) system may be also organized by the master anchor device (e.g. by allocating individual time slots for the mobile devices). A further advantage of the described method may be that, due to the low power requirements of UWB communication, energy consumption (e.g. of a battery-operated mobile device or anchor device) is reduced. Furthermore, the method can be performed in an unidirectional manner, thereby saving time and resources.

In the following, further exemplary embodiments of the method and the communication system will be explained.

According to an exemplary embodiment, the method further comprises: performing a time-of-flight (ToF) based calibration procedure between the master anchor device, the first anchor device, and the second anchor device. In particular by double-side two way ranging (DS-TWR). This may provide the advantage that the accuracy of the described method is further increased. For an exemplary implementation, see FIG. 4 below.

According to a further exemplary embodiment, the method further comprises: i) calculating a first time correction factor (by the first anchor device) based on the calibration procedure, and time-correcting the synchronization of the first clock using the first time correction factor, and/or ii) calculating a second time correction factor (by the second anchor device) based on the calibration procedure, and time-correcting the synchronization of the second clock using the second time correction factor. This may also provide the advantage that the accuracy of the described method is further increased.

According to a further exemplary embodiment, a difference between the master clock and the synchronized first clock and/or the synchronized second clock is in the picosecond range, in particular between 100 and 200 picoseconds. In this manner, an efficient synchronization is provided that may enable an accurate TDoA localization procedure.

According to a further exemplary embodiment, the method further comprises: calculating the spatial position of the mobile device based on the TDoA calculation. In particular by using a triangulation method. This may provide the advantage that a known and standardized procedure can be directly applied. For an exemplary implementation, see FIG. 6 below.

According to a further exemplary embodiment, the communication system comprises a further mobile device and the method further comprises: i) allocating (in particular by the master anchor device) a first time slot for the mobile device, and ii) allocating (in particular by the master anchor device) a second time slot for the further mobile device. The first time slot is temporally different from the second time slot, and the time slots are for transmitting a message to at least one of the group consisting of the master anchor device, the first anchor device, the second anchor device. This may provide the advantage that also a plurality of mobile devices can be efficiently managed and that the spatial position of each mobile device can be accurately determined.

According to a further exemplary embodiment, the mobile device and at least one of the group consisting of the master anchor device, the first anchor device, the second anchor device, comprises a secure key. Additionally or alternatively, the mobile device and at least one of the group consisting of the master anchor device, the first anchor device, the second anchor device, generates a session key, in particular based on the secure key. This may provide the advantage that the described method can be performed in an especially secure manner. This may be especially advantageous in the case when e.g. access to a car or transit gate is associated with the mobile device.

According to a further exemplary embodiment at least one of the group consisting of the master anchor device, the first anchor device, the second anchor device, comprises at least one of: i) an UWB domain configured to receive and/or transmit a message using UWB communication, ii) a secure element configured to store and/or generate a secret key and/or a session key, iii) a network connection configured to obtain a secret key and/or a session key from an external network. In this manner, the described communication system can be made especially secure. This may be especially advantageous in the case when e.g. access to a car or transit gate is associated with the mobile device and/or the anchor devices.

According to a further exemplary embodiment, the mobile device is at least one of the group consisting of a mobile phone, a tag, a token, a key, a keyfob, a smart card. This may provide the advantage that general devices from daily life can be directly applied in the described method.

According to a further exemplary embodiment, the mobile device and/or the anchor devices ae associated with a target device. In particular, the target device is at least one of the group consisting of a car, a door, a transaction terminal, a transit gate. This may provide the advantage that the described method can be implemented into a plurality of important applications that require authentication.

According to a further exemplary embodiment, access to the target device is granted, if the transmission of mobile device payload and/or target device payload via ranging-capable physical layer communication (such as UWB) has been successful.

According to a further exemplary embodiment, secure ranging with an IR-UWB is done by scrambling a timing correlation sequence which allows only systems to perform ranging, which have access to a shared secret key used for scrambling the correlation sequence. The use of a scrambled sequence may ensure that an attacker anchor device or mobile device can be detected by the communication (localization) system. This may prevent wrong calculation of a position caused by attacker messages or signals.

The aspects defined above and further aspects of the invention are apparent from the examples of embodiment to be described hereinafter and are explained with reference to these examples of embodiment. The invention will be described in more detail hereinafter with reference to examples of embodiment but to which the invention is not limited.

BRIEF DESCRIPTION OF THE DRAWINGS

The illustrations in the drawings are schematic. In different drawings, similar or identical elements are provided with the same reference signs.

DESCRIPTION OF EXEMPLARY EMBODIMENTS

Before, referring to the drawings, exemplary embodiments will be described in further detail, some basic considerations will be summarized based on which exemplary embodiments of the invention have been developed.

According to an exemplary embodiment, TDoA is a method to determine the position of an object (e.g. a mobile device) using the time difference of received signals. The concept does not require round-trip measurements between two devices but requires the reception of signals send by an anchor device or a mobile device in a single direction. In particular, a method is described to synchronise slave anchor devices with a master anchor device using in-band UWB signalling and thereby allowing the anchor devices to localise the mobile device tag using a (periodic) broadcast message sent from the mobile device to the anchor devices (or vice versa). Furthermore, the method can be used to determine a secure position using a scrambled training sequence (e.g. according to standard 802.15.4z) sent by the mobile device based on a shared secure key which allows for secure transactions triggered by the mobile device. Such secure transactions include for example opening of a gate or door, or payment for a transit ticket.

According to an exemplary embodiment, a method is provided to synchronise all the anchor devices in a (anchor) communication system to the time base (master clock) of a master anchor device by employing a multimode ranging scheme as described e.g. in standard 802.15.4z and a method to exchange time stamps using in-band signalling. The method enables the anchor devices to derive (time) correction factors advantageous to mitigate time differences (e.g. crystal differences) using the ranging procedure. The method also provides a protocol to allocate contention free or guaranteed time slots for the mobile device(s), in which the mobile device(s) can transmit their messages in "blink" UWB frames.

According to an exemplary embodiment, a protocol is described to manage multiple mobile devices and a synchronization of anchor devices wirelessly using UWB communication (messaging). A TDoA based localization system is provided based on free running anchor devices which are synchronised wirelessly and by employing a protocol which is ensuring that the mobile devices entering the spatial position of the anchor devices are allocated guaranteed (time) slots where they are able to transmit the TDoA blink frames.

According to an exemplary embodiment, the communication system can be extended by adding additional anchor devices and/or by changing the master anchor device role round robin to ensure that the system keeps operational, also when a master anchor device has e.g. link-budget issues. Further, the timing difference between the transmission time slots can be changed as needed and as supported by the hardware.

Figure 1:
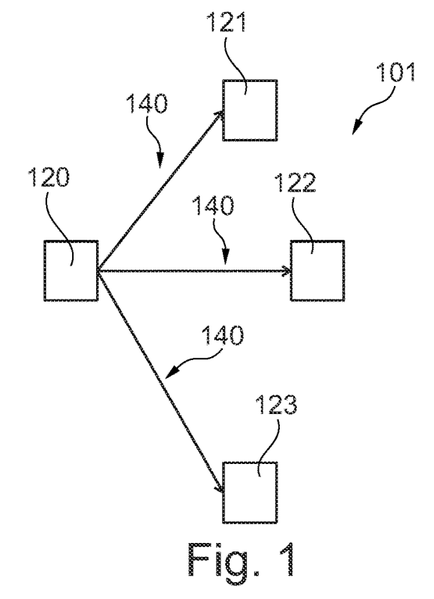
FIG. 1 illustrates an anchor communication system for synchronization a plurality of anchor devices according to an exemplary embodiment of the invention.

FIG. 1 illustrates an anchor communication system 101 for synchronization a plurality of anchor devices 120-123 according to an exemplary embodiment of the invention. The anchor communication system 101 comprises: a master anchor device 120 comprising a master clock, a first anchor device 121 comprising a first clock, a second anchor device 122 comprising a second clock, and a third anchor device 123 comprising a third clock. The master anchor device 120 transmits (broadcasts) a first message 140 to all slave anchor devices 121-123 using a first ultra-wide band (UWB) communication. The first message 140 is a signal or a frame and is indicative of the master clock. In particular, the first message 141 comprises a master time stamp (ts_A0). The slave anchor devices 121-123 receive the first message 140 and provide a respective time stamp (ts_A1, ts_A2, ts_A3) at the arrival time of the first message 140. Then, each slave anchor device 121-123 synchronizes its own clock (first clock, second clock, and third clock) based on the master clock. In particular, each slave anchor device 121-123 calculates a respective offset between the master time stamp (ts_A0) and its own anchor device time stamp (ts_A1, ts_A2, ts_A3). For this calculation, the time of flight of the between the master anchor device 120 and the respective anchor device 121-123 can be advantageously considered.

The synchronization procedure between the master anchor device 120 and the (slave) anchor devices 121-123 can be important to establish a relation between the time stamp counter of the master anchor device 120 (master clock) and the clocks of the slave anchor devices 121-123. In an exemplary implementation, the procedure is performed at fixed intervals (beacon period), wherein the first message 140 (e.g. realised by a beacon frame) is broadcasted by the master anchor device 120, whereby the slave anchor devices 121-123 respectively calculate the offset between their respective clock and the master clock. The beacon frame (first message) carries a payload which contains the RMARKER timestamp (ts_A0) of the frame being transmitted (and is hence associated with the master clock). When the first message 141 is received by the anchor devices 121-123, each anchor device 121-123 performs the following (synchronization) operation:
i) Time-stamping the RMARKER time stamp of the received frame 141, and
ii) Synchronizing its own time stamp counter (e.g. first clock, second clock) with the master anchor device 120, for example (hereby: A0=master anchor device, A1=slave anchor device): ts_An'=ts_An−tof_An, where ts_An' is the value of the local counter at A1 at the instance when ts_A0 has occurred. The offset can then be calculated based on the time correction factor tcf (see below) as follows: offset$_{An}$=tcf$_{An}$*(ts_An'-ts_A0). The offset is a constant offset between the local counter of An and A0. Similarly, all anchor devices 121-123 (with the help of the first message 140) calculate their offset values, respectively. Once the synchronization is complete between the master anchor device 120 and the slave anchor devices 121-123, the set-up is ready for a time difference of arrival (TDoA) based localization procedure. In other words, since the synchronised time-stamps are now available from all slave anchor devices 121-123 with respect to the master anchor device 120 timeline (master clock), the TDoA-procedure can be performed.

Figure 2A:
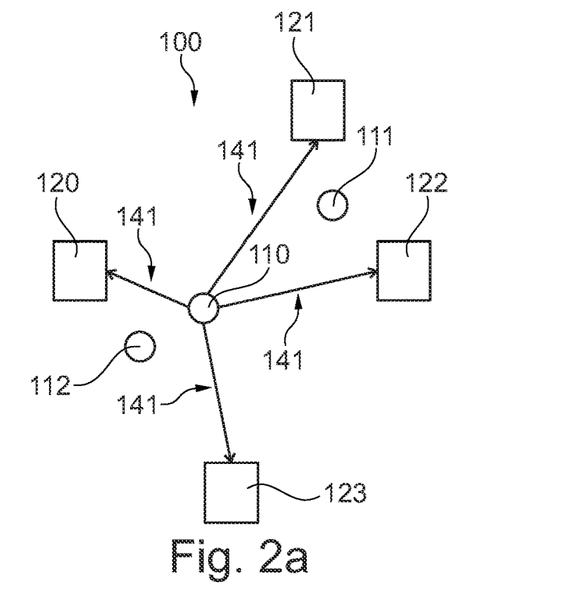
FIGS. 2a and 2b illustrate a communication system for localization of a mobile device according to exemplary embodiments of the invention.

FIG. 2a illustrates a communication system 100 for localization of a mobile device 110 according to exemplary embodiments of the invention. The communication system 100 comprises: the anchor communication system 101 according to FIG. 1 (being the ranging infrastructure) and a plurality of mobile devices 110-112. In the example shown, one mobile device 110 is active and transmits a second messages 141 (unidirectionally), using a second ultra-wide band (UWB) communication, to the plurality of anchor devices 120-123 of the anchor communication system 101. The anchor devices 120-123 of said plurality of anchor devices 120-123 receive the second message 141 at respective arrival times. The communication system then performs a time difference of arrival (TDoA) calculation based on the respective arrival times of the second message 141 at the individual anchor devices 120-123. In order to provide an accurate calculation, the synchronization of the slave anchor devices 121-123 to the master anchor device 120 has to be in the pico-second range. Hence, the above identified master clock, the synchronized first clock, the synchronized second clock, and the synchronized third clock have to be taken into account, when performing the TDoA calculation. After the localization procedure for the mobile device 110 has been performed, further localizations for the further mobile devices 111, 112 can be performed in the same manner Hereby, the master anchor device 120 allocates an individual time slot for each mobile device 110-112 for transmitting its second message 141. In this manner, also a plurality of mobile devices 110-112 can be efficiently managed.

Figure 2B:
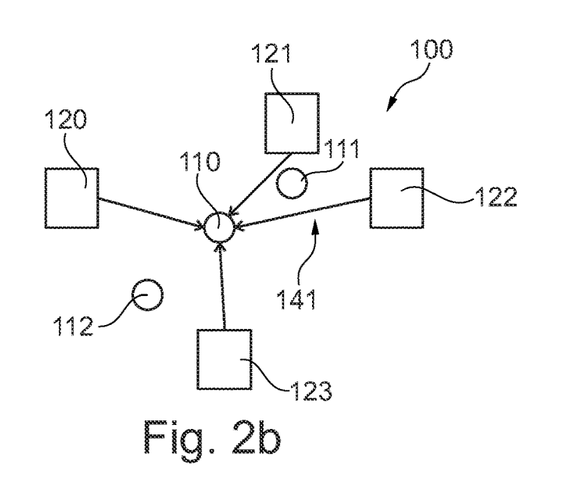

FIG. 2b illustrates a communication system 100 as described for FIG. 2a with the difference, that each anchor device 120-123 of the plurality of anchor devices 120-123 transmits a respective second messages 141, using a second ultra-wide band communication, to the mobile device 110.

Figure 3:
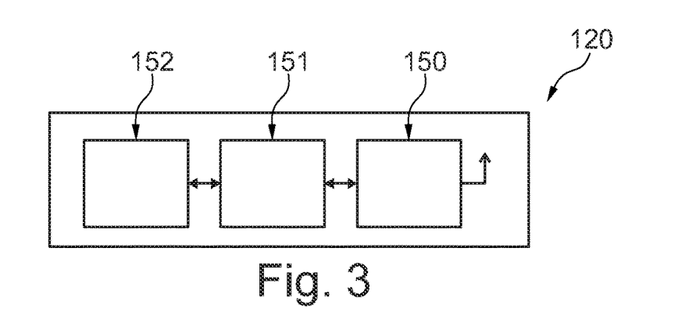
FIG. 3 illustrates an anchor device according to an exemplary embodiment of the invention.

FIG. 3 illustrates an anchor device 120 (which can be one of the group consisting of the master anchor device, the first anchor device, the second anchor device) according to an embodiment of the invention. The anchor device 120 comprises a UWB domain 150 that comprises in particular an UWB transceiver according to standard 802.15.4z, which can transmit and receive data messages (for example the first message 140 and/or the second message 141) to/from the mobile device 110 or other anchor devices 121-123. The anchor device 120 further comprises a secure element 151 to securely store one or more secret keys and to generate one or more session keys for the UWB domain 150. Furthermore, the anchor device 120 comprises a network domain 152 for establishing a connection to an external network. Such a network can allow distribution and configuration of (new) secure keys and/or session keys.

Figure 4:
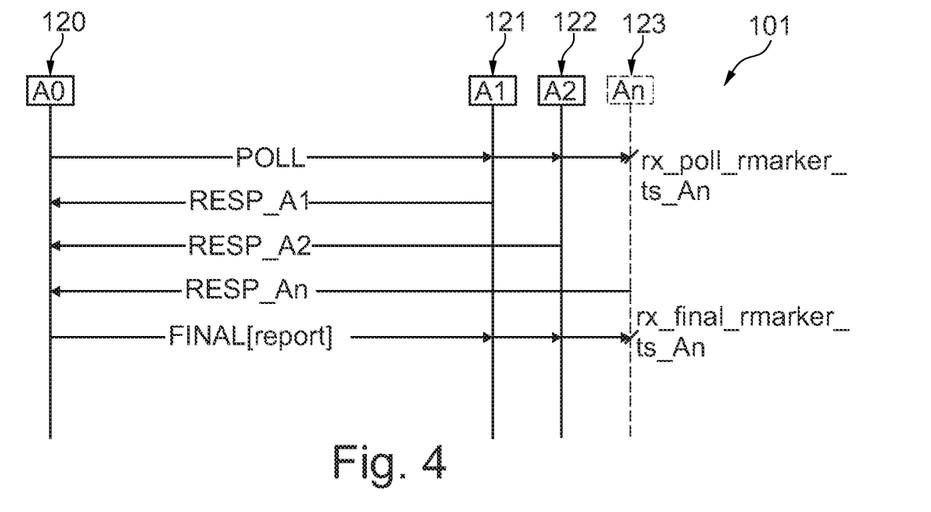
FIG. 4 illustrates a TOF-based calibration procedure in the anchor communication system according to an exemplary embodiment of the invention.

FIG. 4 illustrates a TOF-based calibration procedure in the anchor communication system 101 according to an exemplary embodiment of the invention. In this exemplary implementation, as part of the set-up procedure, a wireless synchronization is performed to ensure that the anchor devices 120-123 are time synchronized. For this purpose, a multi-node secure double-side two way ranging (DS-TWR) procedure is performed between the master anchor device 120 and the (slave) anchor devices 121-123, whereby the ToF is calculated. These measurements can be done several times to calibrate the ToF measurement. Then, the ToF, as measured by each anchor device 121-123, is recorded. In particular, the master anchor device 120 transmits a "POLL" message to each of the anchor devices 121-123. At the time of arrival, said message receives a poll time stamp "rx_poll_rmarker_ts_An". After receiving a response from each anchor device 121-123, the master anchor device 120 transmits a "FINAL" message to each of the anchor devices 120-123. At the time of arrival, said message receives a final time stamp "rx_final_rmarker_ts_An". As part of the ToF calibration procedure, the anchor devices 121-123 can calculate a time correction factor (tcf) based on the time stamp difference of the poll and the final time stamp (ranging message) against an expected fixed reply time. For example in the following manner:

rx_final_rmarker_tsAn-
rx_poll_rmarker_tsAn=$tcf_{An}$*$Treply_{An}$, thus $tcf_{An}$=(rx_final_rmarker_ts$_{An}$-rx_poll_rmarker_tsA)/$Treply_{An}$.

The timing correction factor tcf can also be periodically calculated using a beacon frame as it is transmitted at known intervals (e.g. 100, 200 ms . . . ). The ToF calibration procedure can be especially advantageous in order to make the communication system 100 more self-sufficient without having to program the anchor devices 121-123 with respect to their spatial (geo) positions and the distance between the anchor devices 120-123 during the set-up procedure.

Figure 5:
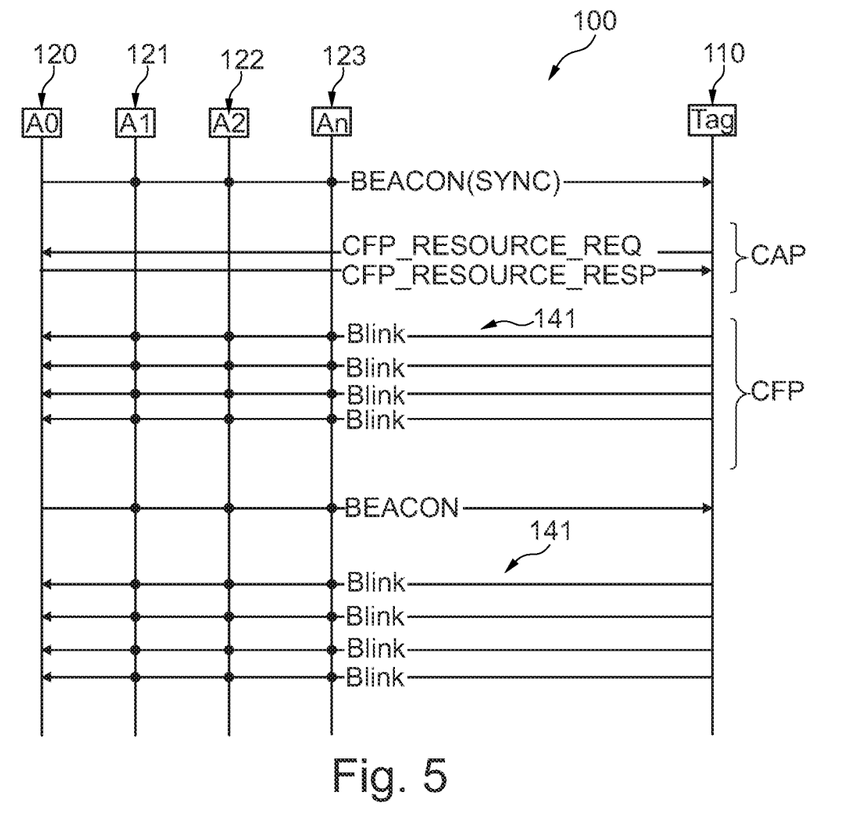
FIG. 5 illustrates a TDoA procedure in the communication system according to an exemplary embodiment of the invention.

FIG. 5 illustrates a TDoA procedure in the communication system 100 according to an exemplary embodiment of the invention. In this exemplary implementation, one of the anchor devices is defined as master anchor device 120. The master anchor device 110 is managing a beacon frame to ensure that the mobile device (110) (or the plurality of mobile devices) can be synchronised to the multi-frame timeline (master clock) of the master anchor device 120. In a contention access period (CAP), the mobile device 110 requests resources for a contention free period (CFP). The master anchor device 120 assigns accordingly the resource and the configuration parameters to the mobile device 110 as follows:

i) PHY parameters such as preamble code, length, PHY protocol data unit configuration etc.

ii) Seed or challenge for session key generation on the master anchor device 120 and the mobile device 110 side (in particular the seed is sent to the secure element and the secure element returns a session key).

iii) Increment for the STS pattern generator (integer number). The UWB domain 150 generates the STS pattern based on the integer number and the session key.

In the case of several mobile devices 110-112, the master anchor device 120 allocates a first time slot for the mobile device 110 and a second time slot for the further mobile device 111. Hereby, the first time slot is temporally different from the second time slot, and the time slots are used for transmitting a ("blink") message to the anchor devices 120-123.

At the specified slot periods during the CFP, the mobile device 110 transmits "blink" messages. The "blink" messages are transmitted in each CFP allocation period until the resources are deallocated by the master anchor device 120. The "blink" messages can hereby comprise the second message 141.

In the assigned CFP time slots (as agreed in the set-up procedure), the mobile device 110 transmits the blink frames (e.g. as the second message 141). Each anchor device 120-123 time-stamps the blink frame at the time instant when it is received, and each anchor device 120-123 transforms the time-stamp to the master anchor time-stamp using the calculated offset (see above), i.e. takes their synchronized clock into account.

Figure 6:
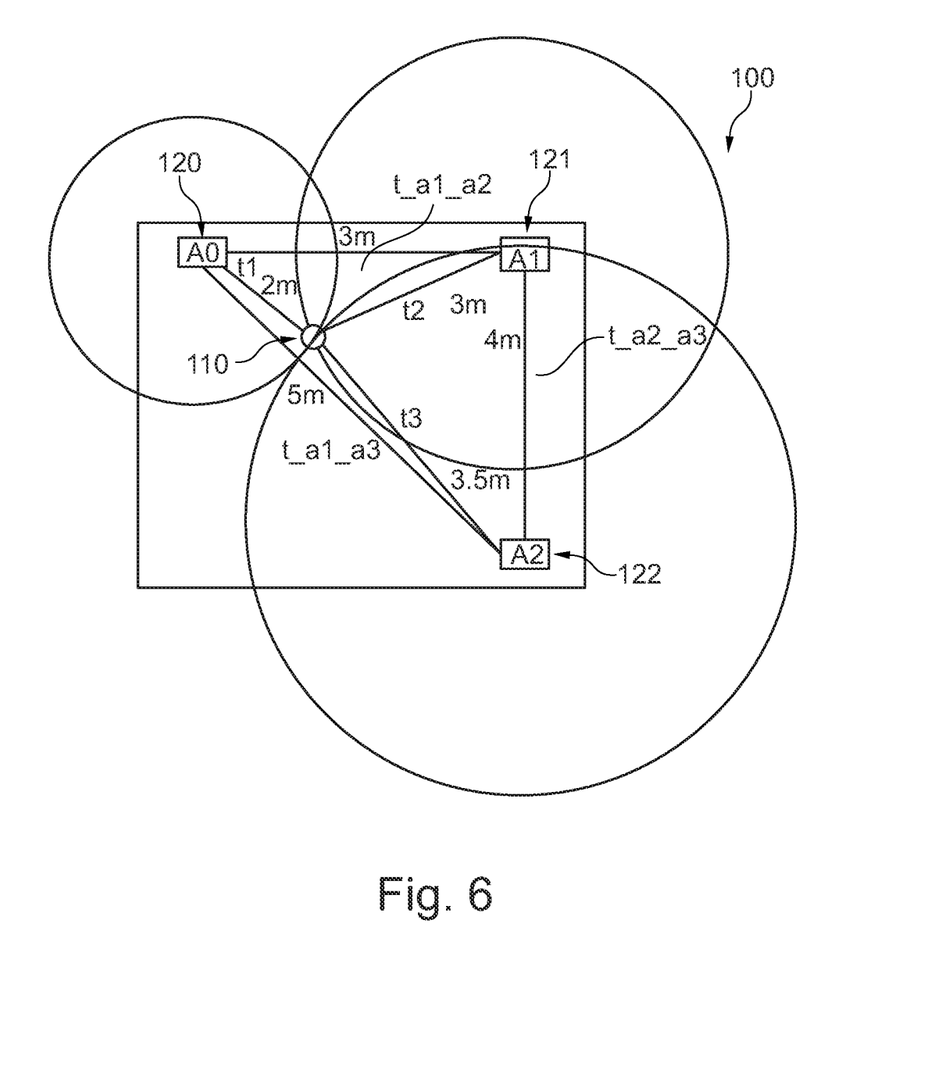
FIG. 6 illustrates a calculation of the position of the mobile device in the communication system using a triangulation method according to an exemplary embodiment of the invention.

FIG. 6 illustrates a calculation of the position of the mobile device 110 in the communication system 100 using a triangulation method according to an exemplary embodiment of the invention. An exemplary configuration of the communication system 100 is shown including examples for distances and time of flight (ToF) information between anchor devices 120-123 and a mobile device 110. Generally, it is not possible for the anchor devices 120-123 to measure the actual time of flight to the mobile device 110. However, the time difference between reception of a second message 141 (packet receptions) from the mobile device 110 (or the other way around) can be measured. Knowing the spatial positions of the anchor devices 120-123 that receive the second message(s) 141 transmitted (broadcasted) from the mobile device 110, it is possible to determine the position of the mobile device 110. This can be done for example by solving a set of cosinus trigonometry equations to determine the absolute time of flight and thus the distance from the mobile device 110 to each individual anchor device 120-123. From the ToF data, the spatial position of the mobile device 110 can be determined. To allow for usage of the TDoA concept to calculate a spatial position of a mobile device 110 as described above, the sequential arrival times of the individual second messages 141 at the anchor devices 120-123 need to be translated to an accurate time difference of arrival at the anchor devices 120-123 based on the master anchor time-base (master clock). Hence, the spatial position of the mobile device 110 can be calculated based on the received data and the relative position of the anchor devices 120-123.

REFERENCE NUMERALS

100 Communication system
101 Anchor communication system
110 Mobile device, tag
111, 112 Further mobile devices
120 Master anchor device
121 First anchor device
122 Second anchor device
123 Third anchor device
140 First message
141 Second message
150 UWB domain
151 Secure element
152 Network domain
A Anchor device
m Meter
t Time

The invention claimed is:

1. A method in a communication system which comprises a master anchor device, a first anchor device, and a second anchor device, the method comprising:
   transmitting, by the master anchor device, a first message to the first anchor device and to the second anchor device using a first ultra-wide band, UWB, communication,
wherein the first message is indicative of a master clock of the master anchor device;
   receiving, by the first anchor device, the first message, and synchronizing a first clock of the first anchor device based on the master clock, wherein the first clock is synchronized with the master clock by calculating a first offset between a master time stamp of the first message and a first time stamp provided when the first message is received at the first anchor device, and wherein the first offset is equal to a time correction factor multiplied by a difference between the master time stamp and a time indicated by the first anchor device when the master time stamp was provided; and
   receiving, by the second anchor device, the first message, and synchronizing a second clock of the second anchor device based on the master clock, wherein the second clock is synchronized with the master clock by calculating a second offset between the master time stamp of the first message and a second time stamp provided when the first message is received at the second anchor device, and wherein the second offset is equal to a time correction factor multiplied by a difference between the master time stamp and a time indicated by the second anchor device when the master time stamp was provided;
   allocating, by the master anchor device, a contention free time slot used for allowing transmission of a mobile device second message;
   transmitting the mobile device second message, by a mobile device, using a second ultra-wide band, UWB, communication during the time slot;
   receiving the mobile device second message, by at least two of the group consisting of the master anchor device, the first anchor device, the second anchor device, at respective arrival times; and
   receiving the respective anchor second messages, by the mobile device, at respective arrival times.

2. The method according to claim 1, wherein the method further comprises:
   performing a time-of-flight, ToF, based calibration procedure between the master anchor device, the first anchor device, and the second anchor device.

3. The method according to claim 2, wherein the method further comprises:
   calculating a first time correction factor, by the first anchor device, based on the calibration procedure, and time-correcting the synchronization of the first clock using the first time correction factor; and/or
   calculating a second time correction factor, by the second anchor device, based on the calibration procedure, and time-correcting the synchronization of the second clock using the second time correction factor.

4. The method according to claim 1, wherein a difference between the master clock and the synchronized first clock and/or the synchronized second clock is in the pico-second range.

5. The method according to claim 1, wherein a difference between the master clock and the synchronized first clock and/or the synchronized second clock is between 100 and 200 pico-seconds.

6. A method for localization of a mobile device in a communication system which comprises the mobile device and an anchor communication system comprising a master anchor device, a first anchor device, and a second anchor device,
wherein the method comprises:
   transmitting, by the master anchor device, a first message to the first anchor device and to the second anchor device using a first ultra-wide band, UWB, communication,
wherein the first message is indicative of a master clock of the master anchor device;
   receiving, by the first anchor device, the first message, and synchronizing a first clock of the first anchor device based on the master clock, wherein the first clock is synchronized with the master clock by calculating a first offset between a master time stamp of the first message and a first time stamp provided when the first message is received at the first anchor device, and wherein the first offset is equal to a time correction factor multiplied by a difference between the master time stamp and a time indicated by the first anchor device when the master time stamp was provided;
   receiving, by the second anchor device, the first message, and synchronizing a second clock of the second anchor device based on the master clock, wherein the second clock is synchronized with the master clock by calculating a second offset between the master time stamp of the first message and a second time stamp provided when the first message is received at the second anchor device, and wherein the second offset is equal to a time correction factor multiplied by a difference between the master time stamp and a time indicated by the second anchor device when the master time stamp was provided;
   allocating, by the master anchor device, a contention free time slot used for transmission of a mobile device second message;
   transmitting the mobile device second message, by a mobile device, using a second ultra-wide band, UWB, communication, receiving the mobile device second message, by at least two of the master anchor device, the first anchor device, and the second anchor device, at respective arrival times;
transmitting respective anchor second messages, by at least two of the master anchor device, the first anchor device, and the second anchor device, using a third ultra-wide band, UWB, communication, and
receiving the anchor second messages, by the mobile device, at respective arrival times; and
performing a time difference of arrival, TDoA, calculation based on the respective arrival times and at least two of the master clock, the synchronized first clock, the synchronized second clock.

7. The method according to claim 6, further comprising: calculating a spatial position of the mobile device based on the TDoA calculation.

8. The method according to claim 7, wherein calculating comprises using a triangulation method.

9. The method according to claim 6, wherein the communication system comprises a further mobile device, the method further comprising:
allocating, by the master anchor device, a first time slot for the mobile device;
allocating, by the master anchor device, a second time slot for the further mobile device;
wherein the first time slot is temporally different from the second time slot, and
wherein the time slots are for transmitting a message to at least one of the master anchor device, the first anchor device, and the second anchor device.

10. The method according to claim 6, wherein the mobile device and at least one of the master anchor device, the first anchor device, and the second anchor device comprises a secure key; and/or wherein the mobile device and at least one of the master anchor device, the first anchor device, and the second anchor device, generates a session key.

11. A communication system comprising:
a master anchor device comprising a master clock;
a first anchor device comprising a first clock; and
a second anchor device comprising a second clock; and
a mobile device;
wherein the master anchor device is configured to:
transmit a first message to the first anchor device and to the second anchor device using a first ultra-wide band, UWB, communication, wherein the first message is indicative of the master clock;
allocate a contention free time slot used by the mobile device to transmit a mobile device second message;
wherein the first anchor device is configured to:
receive the first message and synchronize the first clock based on the master clock, wherein the first clock is synchronized with the master clock by calculating a first offset between a master time stamp of the first message and a first time stamp provided when the first message is received at the first anchor device, and wherein the first offset is equal to a time correction factor multiplied by a difference between the master time stamp and a time indicated by the first anchor device when the master time stamp was provided; and
wherein the second anchor device is configured to:
receive the first message and synchronize the second clock based on the master clock, wherein the second clock is synchronized with the master clock by calculating a second offset between the master time stamp of the first message and a second time stamp provided when the first message is received at the second anchor device, and wherein the second offset is equal to a time correction factor multiplied by a difference between the master time stamp and a time indicated by the second anchor device when the master time stamp was provided;
wherein the mobile device is configured to:
transmit a mobile device second message during the allocated contention free time slot using a second ultra-wide band, UWB, communication, and
wherein at least two of the master anchor device, the first anchor device, and the second anchor device, are configured to:
receive the mobile device second message at respective arrival times; and
wherein the communication system is configured to:
perform a time difference of arrival, TDoA, calculation based on the respective arrival times and at least two of the master clock, the synchronized first clock, and the synchronized second clock.

12. A communication system, wherein the communication system comprises an anchor communication system and a mobile device:
the anchor communication system comprising:
a master anchor device comprising a master clock;
a first anchor device comprising a first clock; and
a second anchor device comprising a second clock;
wherein the master anchor device is configured to:
transmit a first message to the first anchor device and to the second anchor device using a first ultra-wide band, UWB, communication, wherein the first message is indicative of the master clock;
wherein the first anchor device is configured to:
receive the first message and synchronize the first clock based on the master clock, wherein the first clock is synchronized with the master clock by calculating a first offset between a master time stamp of the first message and a first time stamp provided when the first message is received at the first anchor device, and wherein the first offset is equal to a time correction factor multiplied by a difference between the master time stamp and a time indicated by the first anchor device when the master time stamp was provided; and
wherein the second anchor device is configured to:
receive the first message and synchronize the second clock based on the master clock, wherein the second clock is synchronized with the master clock by calculating a second offset between the master time stamp of the first message and a second time stamp provided when the first message is received at the second anchor device, and wherein the second offset is equal to a time correction factor multiplied by a difference between the master time stamp and a time indicated by the second anchor device when the master time stamp was provided; and
allocate a contention free time slot for use by a mobile device to transmit a mobile device second message;
wherein the mobile device is configured to:
transmit the mobile device second message during the allocated contention free time slot using a second ultra-wide band, UWB, communication, and
wherein at least two of the master anchor device, the first anchor device, the second anchor device, are configured to:
receive the mobile device second message at respective arrival times; and
wherein at least two of the master anchor device, the first anchor device, and the second anchor device, are configured to:

transmit respective mobile device second messages during respective contention free time slots using a third ultra-wide band, UWB, communication, and wherein the mobile device is configured to:
receive the second messages at respective arrival times; and wherein the communication system is configured to:
perform a time difference of arrival, TDoA, calculation based on the respective arrival times and at least two of the master clock, the synchronized first clock, and the synchronized second clock.

13. The communication system according to claim 12, wherein at least one of the master anchor device, the first anchor device, and the second anchor device, comprises at least one of:
an UWB domain configured to receive and/or transmit a message using UWB communication;
a secure element configured to store and/or generate a secret key and/or a session key;
a network connection configured to obtain a secret key and/or a session key from an external network.

14. The communication system according to claim 12, wherein the mobile device is at least one of the group consisting of a mobile phone, a tag, a token, a key, a keyfob, and a smart card.

15. The communication system according to claim 12, wherein the mobile device is associated with a target device, and wherein the target device is at least one of the group consisting of a car, a door, a transaction terminal, and a transit gate.

* * * * *